(12) United States Patent
Kraisler et al.

(10) Patent No.: US 10,175,445 B2
(45) Date of Patent: Jan. 8, 2019

(54) APPARATUS AND METHOD FOR ALIGNING LIGHT BEAMS

(71) Applicant: LUMENIS LTD., Yokneam Ilit (IL)

(72) Inventors: Arie Kraisler, Tivka (IL); Arkady Khachaturov, Haifa (IL)

(73) Assignee: Lumenis Ltd., Yokneam (IL)

( * ) Notice: Subject to any disclaimer, the term of this patent is extended or adjusted under 35 U.S.C. 154(b) by 157 days.

(21) Appl. No.: 14/881,045

(22) Filed: Oct. 12, 2015

(65) Prior Publication Data

US 2016/0111845 A1 Apr. 21, 2016

Related U.S. Application Data

(60) Provisional application No. 62/065,782, filed on Oct. 20, 2014.

(51) Int. Cl.
*G02B 7/00* (2006.01)
*G02B 27/10* (2006.01)

(52) U.S. Cl.
CPC ........... *G02B 7/003* (2013.01); *G02B 27/106* (2013.01)

(58) Field of Classification Search
CPC ... H01S 3/0071; G02B 27/106; G02B 27/008; G02B 27/003
USPC ...................................... 250/578.1
See application file for complete search history.

(56) References Cited

U.S. PATENT DOCUMENTS

| | | | | |
|---|---|---|---|---|
| 4,385,834 A * | 5/1983 | Maxwell, Jr. | ........... | F41G 3/326 356/138 |
| 5,163,936 A * | 11/1992 | Black | ................... | A61B 18/201 359/859 |
| 5,978,053 A * | 11/1999 | Giles | ..................... | G01B 11/272 250/201.3 |
| 6,982,785 B2 * | 1/2006 | Van den Engh | ....... | G01N 15/14 356/121 |
| 8,411,340 B2 * | 4/2013 | Khalil | ....................... | G01J 3/02 356/328 |
| 2002/0167656 A1 * | 11/2002 | van den Engh | ....... | G01N 15/14 356/121 |
| 2006/0217688 A1 * | 9/2006 | Lai | ..................... | B23K 26/0624 606/4 |

FOREIGN PATENT DOCUMENTS

GB 2513123 12/2015
WO 2014170815 10/2014

\* cited by examiner

*Primary Examiner* — Seung C Sohn
(74) *Attorney, Agent, or Firm* — ISUS Intellectual Property PLL

(57) ABSTRACT

Apparatus for the alignment of optical beams includes an optical beam; a beam splitter in the path of the optical beam; the beam splitter splits the optical beam into at least two sub-beams paths; a first one of the at least two sub-beam paths is directed through one or more optical devices for amplification of lateral shift alignment; a second one of the at least two sub-beams is directed through one or more optical devices for amplification of angular alignment; the first and the second sub-beams impinge on first and second screens.

11 Claims, 6 Drawing Sheets

APPARATUS AND METHOD FOR ALIGNING LIGHT BEAMS

RELATED APPLICATIONS

This application is related to and claims priority from U.S. Provisional Application No. 62/065,782, filed 20 Oct. 2014, the entire contents of which is herein incorporated by reference.

BACKGROUND AND FIELD OF THE INVENTION

Laser systems are generally comprised of a laser generator and a delivery system. In the case of a medical $CO_2$ laser system, typically a console is provided which contains the laser cavity. An articulated arm and/or other connection device (such as a fiber or waveguide) may be connected to the console in order to deliver the laser beam onto the target tissue.

In order to reduce optical energy losses, proper optical alignment is desirable between the console and the delivery element. The longer this delivery element is and the smaller its diameter, more accurate alignment may be desirable if not necessary. Recently, the use of new articulated arms and the use of small diameter flexible wave guides (fibers) have increased dramatically the required accuracy of such an alignment.

Although laser delivery systems may have a mechanical axis, the optical axis does not necessarily overlap and misalignments are possible. By way of example, one such system is described in Great Britain Patent Application Serial No. 1306832.5, filed Apr. 15, 2013 as well as PCT Application Serial No. PCT/IB2014/060704, filed Apr. 14, 2014, the entire contents of which applications are herein incorporated by reference. The apparatus described in the aforesaid applications provide a universal adaptor to which both an articulated arm and a flexible wave guide (fiber) delivery element may be connected. The alignment of the universal adaptor is critical to the optical performance of each delivery element. The universal adaptor described in the aforesaid apparatus may be installed on laser systems along the manufacturing line or as an upgrade kit to an installed base of laser systems without the universal adapter. Such an upgrade makes it desirable to provide an easy and accurate alignment instrument and method, which is the subject of the present invention.

SUMMARY OF THE PRESENT INVENTION

In one aspect of the present invention, apparatus for the alignment of optical beams includes an optical beam; a beam splitter in the path of the optical beam; the beam splitter splits the optical beam into at least two sub-beams paths; a first one of the at least two sub-beam paths is directed through one or more optical devices for amplification of lateral shift alignment; a second one of the at least two sub-beams is directed through one or more optical devices for amplification of angular shift alignment (and/or misalignment); the first and the second sub-beams impinge on first and second screens.

In another aspect, the first and the second sub-beam paths are independent light beam paths and the beam splitter splits the optical beam one of equally or unequally.

In yet another aspect, the one or more optical devices comprise one or more of: lenses, mirrors or reflectors; the lenses may be selected from between concave lenses and convex lenses.

In yet a further aspect, the first lateral shift alignment sub-beam is directed first through a concave lens and second through a convex lens and third to the first screen. The second angular alignment sub-beam is directed first through a convex lens and second through a concave lens and third to the second screen.

In an aspect, the amplification of the first and the second sub-beam paths are one of: equal or unequal and the apparatus further includes at least one beam position detector operatively associated with one or more of the first and second screens. The at least one beam position detector measures the position of light impinging on the at least one screen.

In yet a further aspect, the beam splitter, the optical devices and the first and second screens are mounted in a unitary housing; the unitary housing may include at least one opening in the housing to receive the optical beam. The optical beam is a laser beam and it may be a visible aiming beam.

In a further aspect, a method of the aligning optical beams includes providing an optical beam; providing a beam splitter in the path of the optical beam; the beam splitter splitting the optical beam into at least two sub-beams paths; directing a first one of the at least two sub-beam paths through one or more optical devices for amplification of lateral shift alignment; directing a second one of the at least two sub-beams through one or more optical devices for amplification of angular shift alignment; and, impinging the first and the second sub-beams on first and second screens.

DETAILED DESCRIPTION OF THE PRESENT INVENTION

Figure 1:
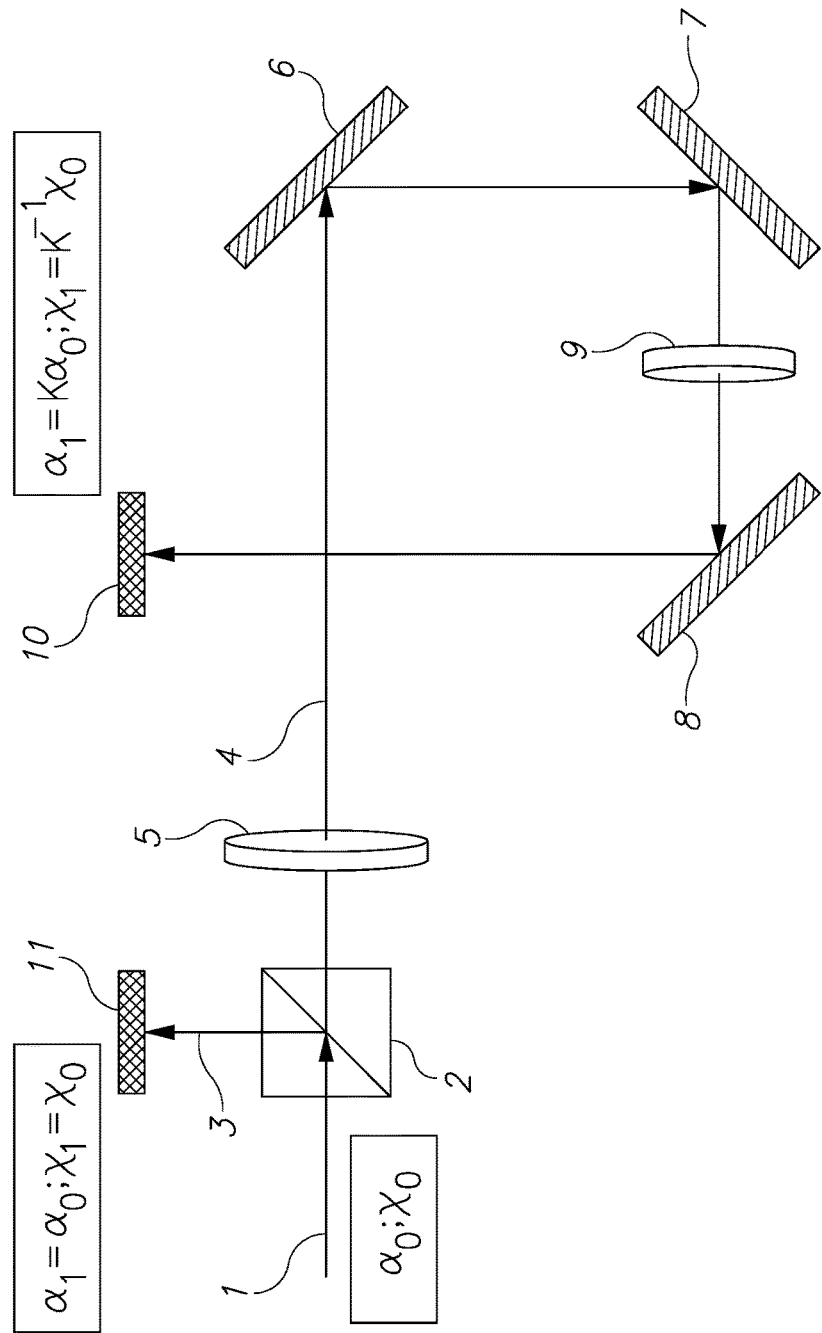
FIG. 1 is an illustration of a prior art telescope which may be utilized for alignment purposes.

A prior art telescope system is illustrated in FIG. 1. Since a $CO_2$ laser beam is invisible to the human eye, there may be a risk of injury to the operator. To obviate that potential problem, a visible aiming beam may be incorporated into the structure to show the position on the Co2 beam. Alignment of a $CO_2$ laser may be accomplished in two steps. In the first step, the aiming beam (visible to the human eye) is aligned and in the second step the $CO_2$ laser is aligned to the aiming beam. The present invention is directed to improvements related to the first step.

FIG. 1 illustrates a Galilean piano-concave telescope with a suitable laser source which emits a laser beam 1 having beam optical axis characterized in a lateral shift $x_o$ and an angular shift $\alpha_o$ from the console main mechanical axis, as may be seen in FIG. 1. A beam splitter 2 directs the first portion of the beam 3 to screen 11 and the second portion of the beam 4 into a telescope configured of lenses 5 and 9, as well as mirrors 6, 7 and 8 which fold the light beam. The beam 3 then impinges screen 11 which retains the same lateral and angular shifts as of the original beam since no optical manipulation or amplification is performed as to beam 3. The second beam 4 passes through the telescope made up of lenses 5 and 9 and mirrors 6, 7 and 8 and then impinges on screen 10.

The telescope of FIG. 1 magnifies the angular shift by the factor $$K = \frac{f_1}{f_2} \approx 4,$$

where $f_1$ and, $f_2$; are the focal lengths of respectively convex (5) and concave (9) lenses. Different lenses with different optical power may be used in order to get a desired magnitude of the K-factor. At the same time however, the lateral shift is "attenuated" by the same K-factor. Therefore, the beam shift which may be seen on screen 10 is mainly due to its angular misalignment. And that is why, by minimizing the beam shift on the screen 10, it is possible to perform angular alignment. Once the beam is angularly aligned, the shift on the screen 11 indicates only the lateral shift of the initial beam and may be used to minimize it.

A disadvantage of the prior art system shown In FIG. 1 is that the lateral shift of initial beam 3, seen on screen 11, is not "amplified". This strongly limits the level of its alignment accuracy.

Figure 2:
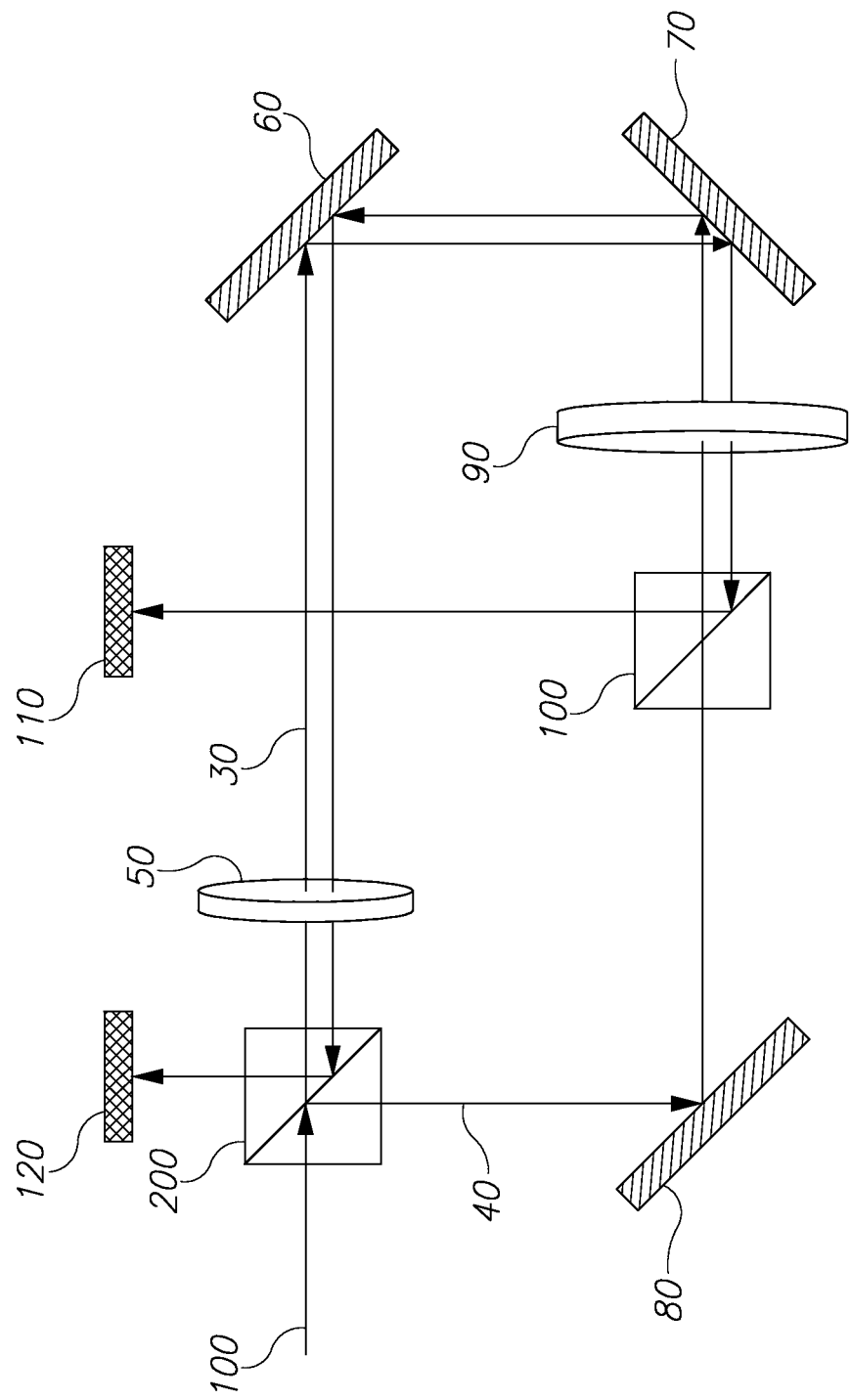
FIG. 2 is a schematic illustration of a first embodiment of the telescope of the present invention.

One embodiment of the present invention, shown in FIG. 2, uses the same telescope arrangement of FIG. 1 but in the opposite direction to "amplify" the lateral shift of the initial beam 100 before it reaches screen 120. In this arrangement, both misalignments (angular and lateral) would be multiplied by the same factor. According to this scheme, initial beam 100 will be split by beam splitter 200 into beam 30 which will propagate in a forward direction across the convex lens 50 to the concave lens 90 of the telescope and will impinge on screen 110 after passing through beam splitter 100. In FIG. 2, mirrors or other reflectors 60, 70 and 80 are utilized to fold the beam path(s). The foregoing portion of the present invention is like the arrangement of FIG. 1 prior art device, in which the lateral shift is decreased and angular shift is increased. In FIG. 2, beam 40 will be directed by beam splitter 200 to enter the same telescope configuration but in the opposite direction—first through the concave lens 90 then through the convex lens 50 and only then will the beam 40 be directed to impinge on screen 120. Along this process, beam 40's angular shift will be decreased by factor K and its lateral shift will be increased by the same factor. The foregoing arrangement of FIG. 2 allows for much higher accuracy when alignment of the lateral shift is performed.

It should be emphasized that the optical manipulation performed to amplify the angular shift also reduces the spot size of the beam while the optical manipulation done to amplify the lateral shift increases the spot size of the beam. A small spot size means high fluence which may cause strong reflection and glare while a large spot size means low fluence which may make the (aiming) beam invisible and thus defeating the purpose of the aiming beam in the first place. Therefore, according to another aspect of the invention, beam splitter 200 of FIG. 2 may be constructed and designed to split the beam in an uneven manner. For example, since the calibration procedure is being performed, among other things, by direct visual reckoning, detecting the position of the at least one beam observed on screens 120 and 110 (in FIG. 2) may assist the user. Since the spot size on screen/detector 110 of beam 30 is bigger than the spot size of beam 40 on detector 120, beam splitter 200 may be configured to split aiming beam in such a way that the observed fluences on detectors 110 and 120 are about the same although the spot sizes of beams 30 and 40 are different. Another limitation of system shown in FIG. 2 is that the same optical lenses are used for both the forward and the opposite paths and therefore the same increasing/decreasing optical factors K are imposed for both lateral and angular alignments.

Thus, in order to avoid the foregoing limitations, it may be desirable to provide two separate telescopes, each having its own set of optics, to provide different optical powers to control each of the angular and lateral shifts separately according to a desired or defined alignment accuracy criteria.

Figure 3:
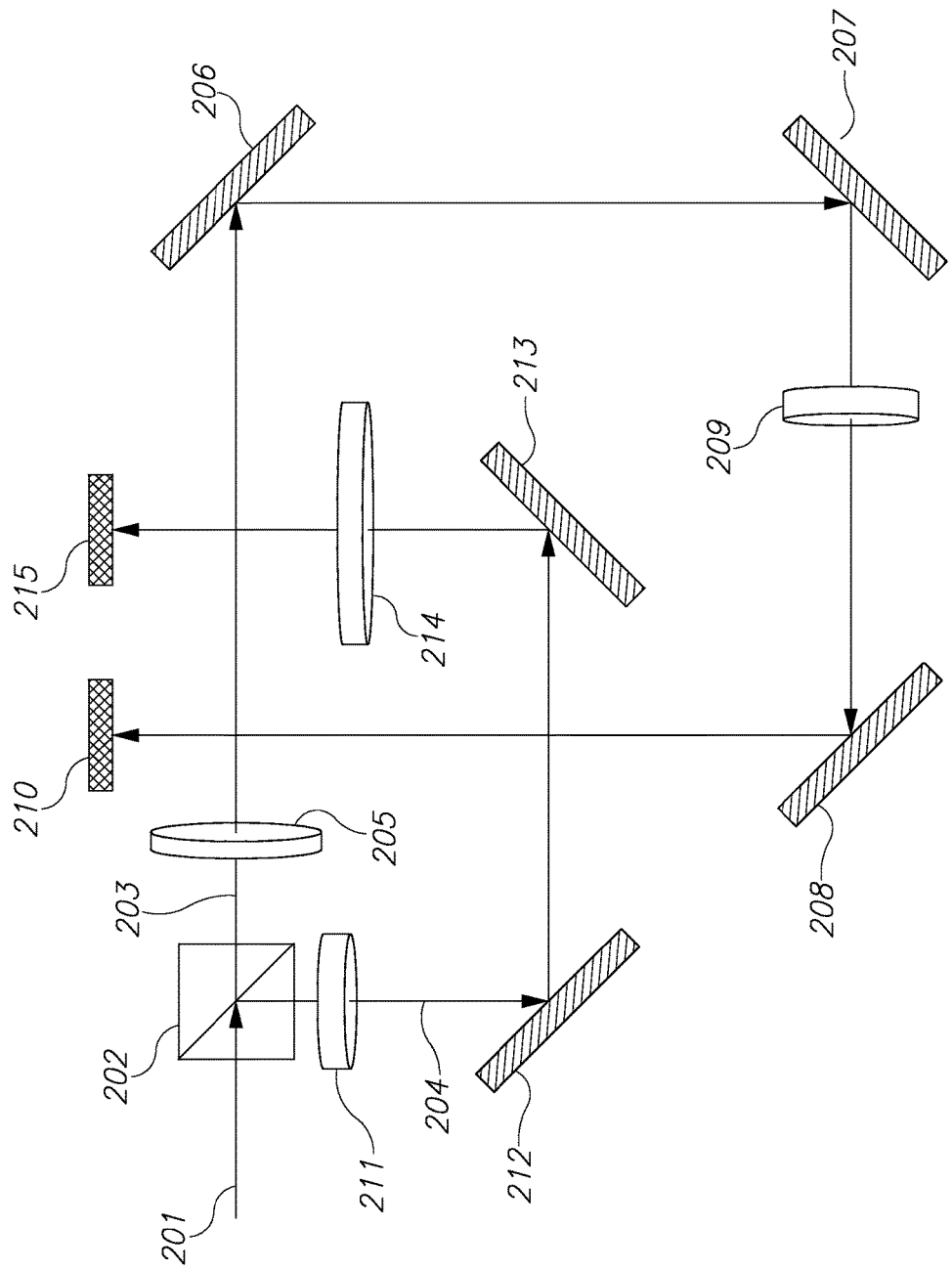
FIG. 3 is a schematic illustration of another embodiment of the telescope of the present invention.

Such an embodiment is illustrated in FIG. 3. The configuration in the embodiment of FIG. 3 may be implemented if different "amplification" coefficients are desired for angular and lateral shifts of the initial beam 201. Also, in this embodiment, beam splitter 202 may be chosen to un-equally split the initial beam 201 into sub-beams 203 and 204 to better control spot size and fluence, as described above.

Unlike the lens arrangements in FIG. 2, in FIG. 2 beam 203 travels first through the convex lens 205 and then through the concave lens 209 prior to impinging on the screen 210 for angular alignment. Mirrors or other reflectors 206, 207 and 208 act to fold the light beam path to screen 210. Beam 204, in contrast, first passes through concave lens 211 and then through convex lens 214 before the beam is impinged on lateral alignment screen 215. Mirrors or other reflectors 212 and 213 fold the light beam path to screen 215.

Figure 4:
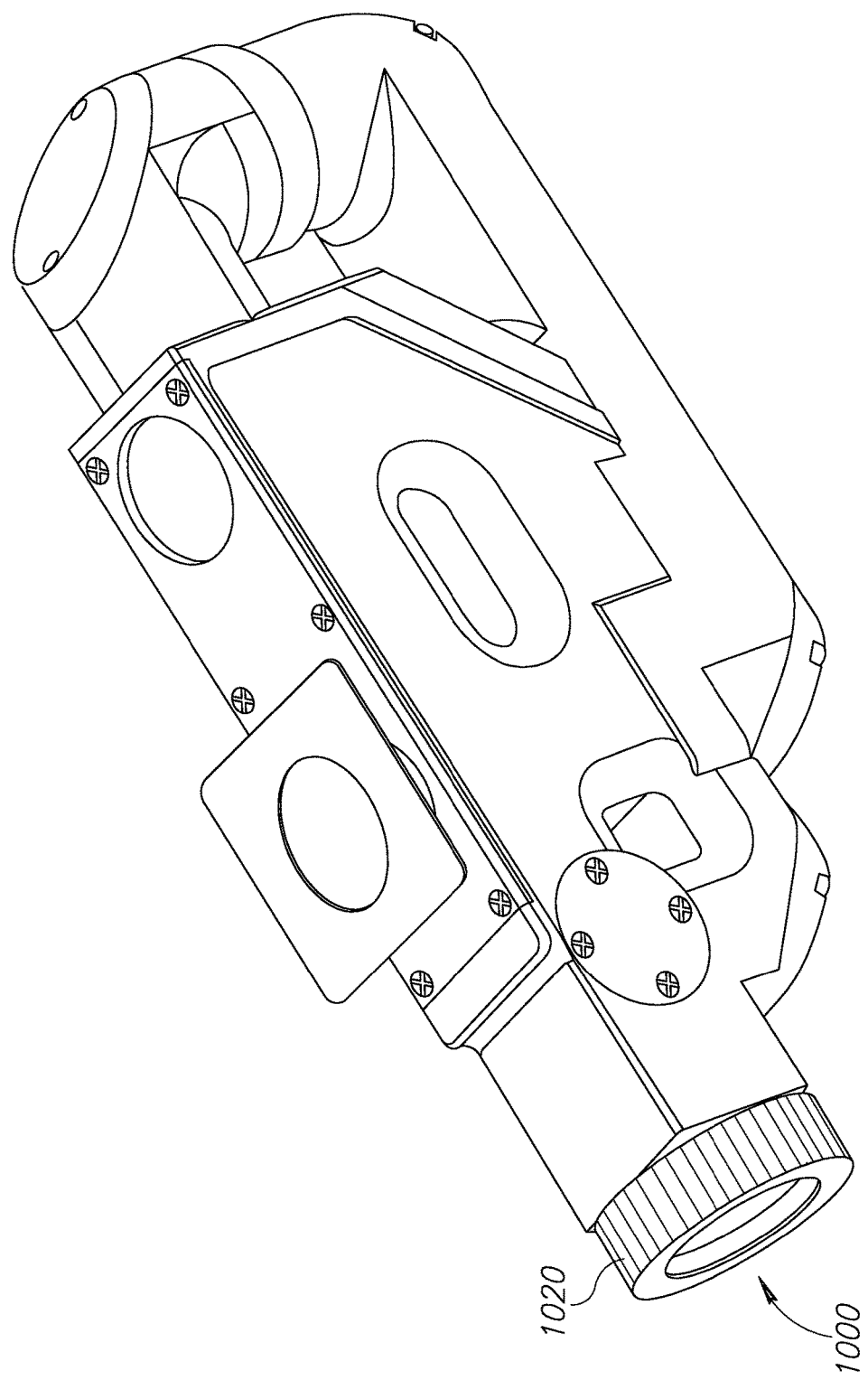
FIG. 4 is an illustration of a housing structure into which a telescope made in accordance with the present invention may be fitted.

The optical elements of FIG. 3 may be mounted in a unitary housing such as that shown in FIG. 4 which contains in one package all of the lenses, beam splitter and mirror structures of FIG. 3. In FIG. 4, the optical axis of the incoming laser beam corresponding to beam 201 in FIG. 3 is shown as arrow 1000. In addition, a juncture device 1020 may be mounted on the housing for the purpose of mounting the housing on a laser console device.

Figure 5:
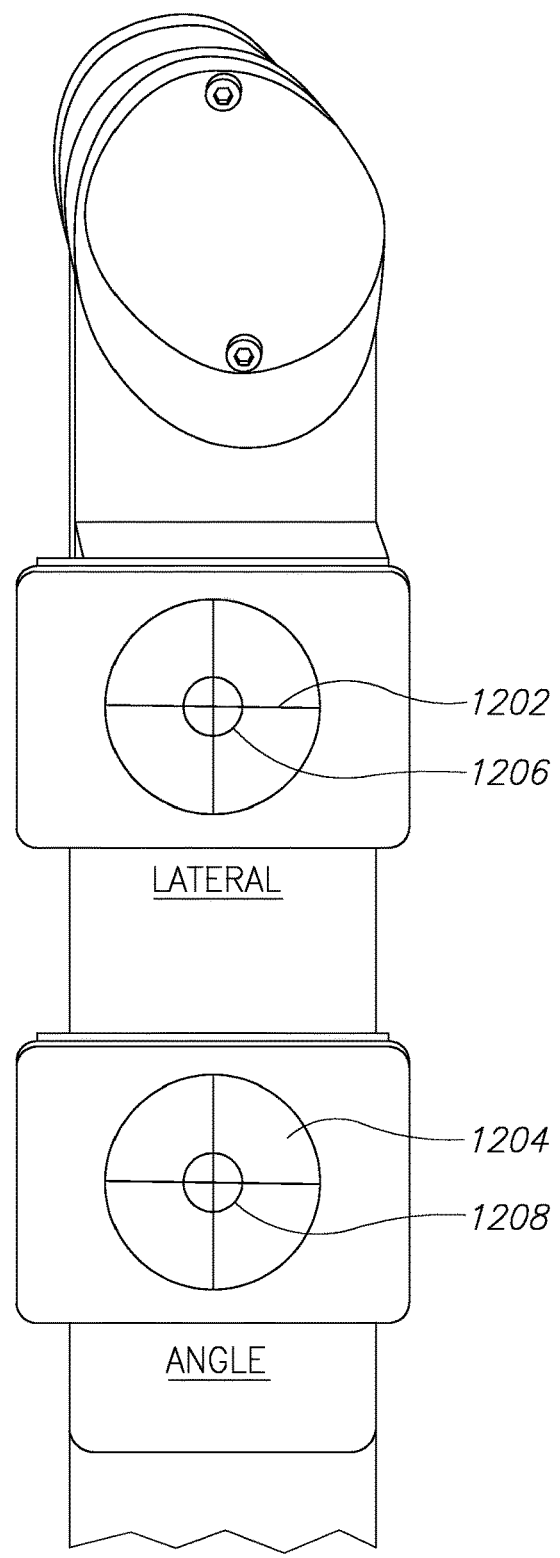
FIG. 5 is an illustration of the housing structure of FIG. 4 with lateral and angular alignments shown.

FIG. 5 provides an illustration of a close-up view of the apparatus of the present invention in which the viewing screens 1202 and 1204 correspond to lateral alignment screen 215 and angular alignment screen 210 of FIG. 3 respectively. FIG. 5 also illustrates alignment beams 1206 and 1208 more or less centered on screens 1202 and 1204.

Figure 6:
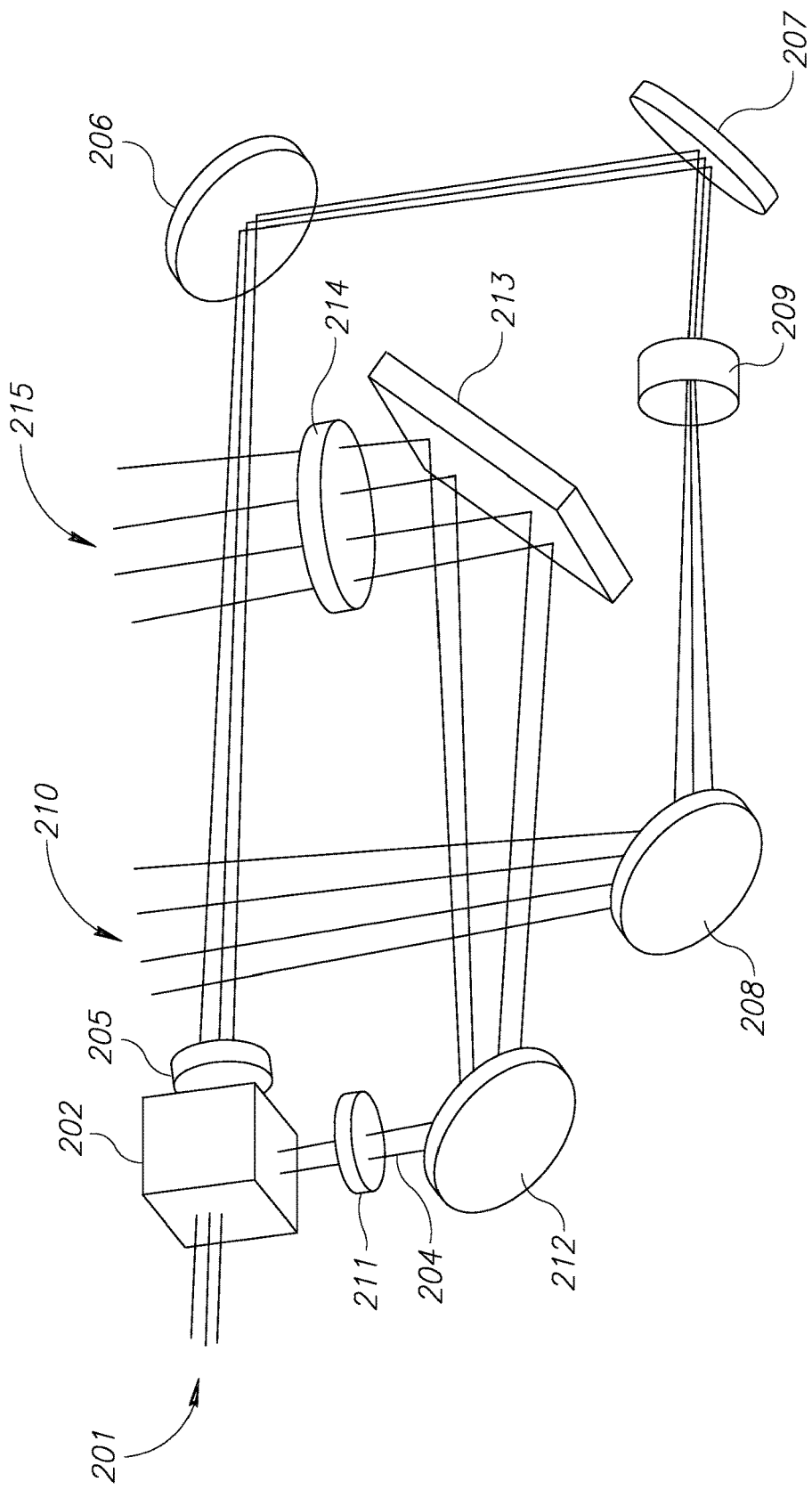
FIG. 6 is a perspective view of the embodiment of FIG. 3.

FIG. 6 provides a different perspective view of the optical paths of the light beams of FIG. 3, using the same reference numerals for identification purposes as shown in FIG. 3.

What we claim is:

1. Apparatus for the alignment of a visible optical beam comprising:

a visible optical beam;

a beam splitter downstream of the visible optical beam;

wherein the beam splitter is constructed and arranged to split the visible optical beam into two unequal visible sub-beams forming first and second optical paths;

the first optical path being downstream from the beam splitter, the first optical path including a first concave lens downstream from the beam splitter, a first convex lens downstream from the first concave lens, and a first screen downstream from the first convex lens for amplification of lateral shift alignment;

the second optical path being downstream from the beam splitter, the second optical path including a second convex lens downstream from the beam splitter, a second concave lens downstream from the second convex lens, and a second screen downstream from the second concave lens for amplification of angular shift alignment;

wherein the amplification of the first and the second sub-beams are unequal and, wherein the first and the second sub-beams impinge on the first and the second screens.

2. The apparatus of claim 1 wherein the first and the second sub-beams are independent light beam paths.

3. The apparatus of claim 1 further comprising at least one beam position detector operatively associated with each of the first and second screens.

4. The apparatus of claim 3 wherein the at least one beam position detector measures the light impinging on the at least one beam position detector.

5. The apparatus of claim 1 wherein the beam splitter, the first and second concave lenses and the first and second convex lenses and the first and second screens are mounted in a unitary housing.

6. The apparatus of claim 5 wherein the unitary housing further comprises at least one opening in the housing to receive the visible optical beam.

7. The apparatus of claim 1 wherein the visible optical beam is a visible laser beam.

8. A method of the aligning two optical beams comprising:

providing an invisible optical beam;

providing the apparatus according to claim 1 for receiving the visible optical beam;

providing a beam splitter in the path of the visible optical beam;

the beam splitter splitting the visible optical beam into at least two unequal visible sub beams paths;

directing the first one of the two visible sub-beams first through the concave lens and second through the convex lens and third to the first screen for amplification of lateral shift alignment;

directing the second one of the two visible sub-beams first through the convex lens and second through the concave lens and third to the second screen for amplification of angular shift alignment;

wherein the amplification of the first and the second sub-beams are unequal;

impinging and aligning the first and the second visible sub-beams on the first and the second screens; and based on the alignment of the first and the second visible sub-beams on the first and second screens, aligning the invisible beam to the first and the second visible sub-beams.

9. The method of claim 8, wherein the invisible beam is an optical beam produced by a $CO_2$ laser source.

10. The method of claim 8, wherein the splitting the visible optical beam into two unequal visible sub-beams is such that the fluences of the sub-beams impinging on the first and second screens are approximately equal.

11. The apparatus of claim 1, wherein the split of the visible optical beam into two unequal sub-beams is such that the fluences of the sub-beams impinging on the first and second screens are approximately equal.

* * * * *